United States Patent Office 3,594,210
Patented July 20, 1971

3,594,210
METHOD OF CONTROLLING RESIN DEPOSITION ON ABSORBENT MATERIALS
Arthur Drelich, Plainfield, N.J. assignor to
Johnson & Johnson
No Drawing. Filed Apr. 17, 1969, Ser. No. 817,177
Int. Cl. B44d 1/092, 5/00
U.S. Cl. 117—38                                    12 Claims

ABSTRACT OF THE DISCLOSURE

A method of controlling resin deposition on absorbent materials by treating the absorbent material with certain polyelectrolyte compounds and applying an emulsion polymerized resin to the treated material. The product obtained by the method is also disclosed.

---

This invention relates to a method of depositing a resin on an absorbent material in a controlled manner to prevent migration of the resin over the material during application.

Emulsion polymerized resins are widely used throughout many industries. They have found use in the coating industries for the coating of woven fabrics, paper and other materials. The resins are also used as adhesives for laminating materials or for bonding fibrous webs. These resins have also found wide use as additives in the manufacture of paper, the printing industry and other industries.

In most instances the resin is dispersed in water and when applied from the aqueous solution is carried by the water until the water is driven off. If it is desired to place the resin on the surface of porous or absorbent sheet material, the material tends to absorb the water and carry the resin into the material rather than depositing the resin merely on the surface. If such resins are used in bonding nonwoven fabrics, especially in pattern bonding, the water tends to wick along the fibers and carry the resin with it. Although placed in a specific pattern, the pattern will spread due to the diffusion of the water and resin until the water is driven off.

I have now discovered a method of applying emulsion polymerized resin compositions to absorbent materials so that the resin may be deposited in a controlled manner.

Many papers today are made with resin additives to give the paper special qualities and properties. A major problem in the formation of such papers is the uniformity of the paper. By utilizing my improved method for controlling resin deposition in the formation of such papers, highly uniform papers may be produced.

Emulsion polymerized resins are also used in the printing industry and the utilization of my method for controlling resin deposition improves the clarity of the print and allows control of the printing process.

The resins which may be used in accordance with the present invention are the emulsion polymerized resins which are stable under moderately acid or alkaline conditions, i.e. pH's of 2.5 to 10.5. These resins are produced by emulsifying the monomers, stabilizing the emulsion with a surfactant system and polymerizing the monomers in the emulsified state to form a solid resin polymer. The solid polymer is usually dispersed in an aqueous medium as discrete particles of colloidal dimensions (1 to 2 microns or smaller) and is generally termed a "resin emulsion" or "latex."

In accordance with the present invention I have discovered that the deposition of emulsion polymerized resins on absorbent materials may be controlled by first treating the absorbent material with an aqueous solution containing from about 0.02% to 1% of a high molecular weight polyelectrolyte polymer having cationic constituents containing nitrogen in the form of amines, amine salts, imines, amides etc. and applying the emulsion polymerized resin to the treated absorbent material. Unexpectedly the diffusion of the resin in the absorbent material is greatly inhibited even in the presence of large amounts of water.

In the dispersion of the emulsion polymerized, colloidal resin particles, there exists around each particle, an electrokinetic charge called the Zeta Potential. In most colloids this charge is negative and tends to cause the particles to repel each other and stay in the dispersed form. It is believed that a polyelectrolyte polymer containing certain cationic constituents reduces the zeta potential of the resin particles and by so doing inhibits the particle from diffusing in its water carrier. This, of course, is one suspected theory as to why my new methods allow for the control of the deposition of resins on absorbent materials.

The desired binder migration control resulting from the pretreatment of the absorbent material with the aqueous polyelectrolyte solution and the subsequent printing of the impregnated absorbent material with the desired pattern of polymeric resin binder, however, is realized fully only if the printing with the polymeric resin binder takes place while the absorbent material is still wet with the polyelectrolyte solution. Under such circumstances, the penetration of the polymeric resin binder into the absorbent material rapidly takes place under controlled conditions and resin bonding takes place completely through the absorbent material from the top surface to the bottom surface substantially instantaneously.

Such a bonded absorbent material with a suitable binder is capable of withstanding laundering and/or dry cleaning; it withstands relatively rough usage and has good abrasion resistance.

However, if drying of the absorbent material were permitted subsequent to the impregnation with the polyelectrolyte solution and the polymeric resin binder were to be applied to the dried absorbent material, there would be very little penetration of the polymeric resin binder into the absorbent material and there would merely be a surface deposition of polymeric resin binder on the top surface of the absorbent material. As a result, the absorbent material, being unbonded on the back side, would not be acceptable as a uniformly or adequately bonded product, for example, in the nonwoven fabric industry. It would be incapable of withstanding laundering; it would fall apart in use; and the unbonded back surface would be incapable of resisting abrasion.

The polyelectrolyte compounds suitable for use in the present invention are the high molecular weight polymers which are water soluble or colloidally dispersable and have a repeating cationic constituent on the polymer backbone. The cationic substituents suitable for use in accordance with the invention are those groups containing nitrogen having a positive charge as are well known in the art, it includes the amines, amine salts, imines, amides, etc.

The amount of polyelectrolyte compound used will vary in accordance with its cationic activity, the resin used and the degree of control of resin deposition that is desired. From about 0.1% to 5% of polyelectrolyte by weight of the resin to be deposited on the absorbent surface may be used in accordance with the present invention. It is uneconomical to use the higher amounts of polyelectrolytes especially in view of the relative cost of some of these compounds compared to the resin and hence, it is preferred to keep the upper limit at 5% or less.

The resins which may be used in the method of the present invention are the emulsion polymerized resins which are in the form of solid resin particles dispersed in a liquid which is usually water. These resin dispersions or resin emulsions as they are called, may be anionic, nonionic or even polyionic and the dispersion is stable at pH's 2.5 to 10.5. Suitable examples are the polyvinyl chlorides, polyvinyl acetates, polyacrylic resins, etc.

Generally, the particle size in the resin dispersions will vary from about 1/10 of a micron or smaller to 3 to 5 microns in size. The amount of resin solids in the dispersion will vary from 1/10 of a percent solids up to 75% or even higher solids, generally dependent upon the resin used, the sufactant system and the conditions under which the polymerization was carried out.

The amount of resin which is applied to the absorbent material varies within relatively wide limits, depending upon the resin binder itself, the nature and character of the absorbent material being bonded, its intended use, etc. A range of from about 4% by weight to about 50% by weight, based on the weight of the absorbent material, is satisfactory under substantially all uses. Within the more commercial limits, however, a range of from about 5% by weight to about 30% by weight, based on the weight of the absorbent material, is preferred.

In carrying my invention into practice the polyelectrolyte is dissolved or dispersed in an aqueous medium and the aqueous medium containing the polyelectrolyte applied to the absorbent material to be treated with resin. The medium containing the polyelectrolyte may be sprayed or padded onto the absorbent material as desired. The resin dispersion is applied to the treated absorbent material by printing the resin dispersion on the material or by padding, spraying, impregnating or other techniques for applying emulsion polymerized resins to absorbent materials.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

A fibrous web of 100% rayon fibers, 1½ denier and 1½ inch in length, weighing 500 grains per square yard, is impregnated to 100% by weight pick-up with a 0.2% aqueous solution of a salt of a complex polyamine. An example of such a salt is sold by the Rohm and Haas Company under the trademark Lufax 295.

A resin dispersion containing 40% by weight of a self cross-linking acrylic polymer which is predominately ethyl acrylate, 0.4% of ammonium chloride catalyst, 0.4% of an antifoaming agent, with the remainder water is printed on the impregnated web in a pattern of six horizontal wavy lines per inch. The printing of the resin binder pattern on the fibrous web takes place while the fibrous web is still wet with the polyamine solution.

The width of each line printed is about 0.018 inch as measured on the engraved roll. The amount of resin solids applied is approximately 20% by weight of the web.

The printed fabric is dried at 270° F. for 30 seconds in contact with heated metal rollers. The resultant fabric weighs 600 grains per square yard. The width of the binder stripe in the resultant fabric is approximately 0.035 inch and extends completely through the fabric from the top surface to the bottom surface.

EXAMPLE II

A fabric made as described in conjunction with Example I is made with the exception that the salt of the complex polyamine is omitted from the initial impregnating aqueous solution. The width of the binder stripe in the resultant fabric is approximately 0.16 inch or almost 5 times as wide as the width of the binder stripe of the fabric or Example I.

EXAMPLE III

The procedures of Example I are followed substantially as set forth therein except that the fibrous web is dried after its impregnation with the polyamine solution. The resin binder dispersion is then printed with a similar 6-line pattern on the dried fibrous web. Study of the bonded fabric, after final drying, reveals that the resin binder is primarily on the top surface of the fabric and that it has not penetrated into the fabric to any significant extent. As a result, the fabric is substantially unbonded on its bottom surface. Such non-uniform bonding is undesirable and the product is unsatisfactory for use in the nonwoven fabric industry.

EXAMPLE IV

The procedures set forth in Example I are carried out substantially as set forth therein except that 0.2% of the polyethylene imine having a molecular weight of about 20,000 is substituted for the 0.2% of a salt of a complex polyamine. The results are comparable to those of Example I. The resin bonding extends through the fibrous web from the top surface thereof to the bottom surface and the lateral migration of the binder is minimal.

EXAMPLE V

The procedures set forth in Example I are carried out substantially as set forth therein except that 0.5% of a cationic starch containing complex amine groups is substituted for the 0.2% of a salt of a complex polyamine. Results comparable to those of Example I are obtained. The resin bonding extends completely through the fibrous web from the top surface thereof to the bottom surface. The lateral migration of the binder is minimal.

EXAMPLE VI

The procedures of Example I are followed substantially as set forth therein except that Reten 210 (Hercules Chemical Co.) a strongly cationic, water-soluble, synthetic, complex polyamine having a very high molecular weight of at least about one million is used. After impregnation of the fibrous web with the polyamine and while the fibrous web is still wet, the resin dispersion is printed thereon. The results are satisfactory and are comparable to the results obtained in Example I. The resin bonding extends completely through the fibrous web from the top surface to the bottom. The lateral migration of the binder is minimal.

EXAMPLE VII

The procedures of Example I are followed substantially as set forth therein with the exception that the resin dispersion contains approximately 45% by weight of a polyvinyl acetate-N-methylol acrylamide copolymer. The resin binder penetrates through the fabric very rapidly and bonds it satisfactorily from the top surface to the bottom surface. The lateral migration of the binder is minimal.

EXAMPLE VIII

The procedures of Example I are followed substantially as set forth therein except that the resin used is a polyvinyl acetate-ethyl acrylate copolymer. The results are comparable to those obtained in Example I. The resin binder extends completely through the fibrous web and bonds it satisfactorily from the top surface to the bottom surface. The lateral migration of the binder is minimal.

EXAMPLE IX

The procedures of Example I are followed substantially as set forth therein except that the resin used is a methyl methacrylate-ethyl acrylate copolymer. The results are comparable to those obtained in Example I. The resin binder extends completely through the fibrous web and bonds it satisfactorily from the top surface to the bottom surface. The lateral migration of the binder is minimal.

EXAMPLE X

The procedures of Example I are followed substantially as set forth therein except that the resin used is a methyl methacrylate-ethyl hexyl acrylate copolymer. The results are comparable to those obtained in Example I. The resin binder extends completely through the fibrous web and bonds it satisfactorily from the top surface to the bottom surface. The lateral migration of the binder is minimal.

EXAMPLE XI

The procedures of Example I are followed substantially as set forth therein except that the resin used is a butyl acrylate-methyl methacrylate copolymer. The results are comparable to those obtained in Example I. The resin binder extends completely through the fibrous web and bonds it satisfactorily from the top surface to the bottom surface. The lateral migration of the binder is minimal.

Although the preceding examples have merely disclosed one specific form of pattern bonding, namely, a horizontal wavy line pattern such as disclosed in U.S. Pat. 3,009,822 which issued Nov. 21, 1961, other forms of pattern bonding are applicable. Such other forms are noted in the above mentioned patent, as well as in U.S. Pats. 2,669,757 and 2,782,130 which issued Feb. 23, 1954 and Feb. 19, 1957 respectively.

Having now described the invention in specific detail and exemplified the manner in which it may be carried into practice, it will be readily apparent to those skilled in the art that innumerable variations, applications, modifications, and extensions of the basic principles involved may be made without departing from its spirit and scope.

What is claimed is:

1. A method of controlling the deposition of emulsion polymerized resins on absorbent fibrous materials comprising treating the absorbent material with an aqueous solution containing from about 0.02% to 1% by weight of a high molecular weight polyelectrolyte polymer having cationic substituents containing nitrogen having a positive charge, applying an emulsion polymerized resin to the treated absorbent material while it is still wet with said polyelectrolyte solution, and drying the material with the polyelectrolyte polymer and resin thereon.

2. A method according to claim 1 wherein, the polyelectrolyte polymer is polyethylene imine.

3. A method according to claim 1 wherein, the polyelectrolyte is a salt of a complex polyamine.

4. A method according to claim 1 wherein, the polyelectrolyte is a chemically modified cationic starch.

5. A method according to clami 1 wherein, the emulsion polymerized resin is a dispersion of a self cross-linking acrylic polymer.

6. A method according to claim 1 wherein, the emulsion poymerized resin is applied to the treated material in a pattern.

7. A method according to claim 1 wherein, the absorbent material is uniformly impregnated with an aqueous solution of polyethylene imine and a dispersion of a self cross-linking acrylic resin is printed in a pattern on the treated material.

8. Absorbent fibrous materials substantially uniformly impregnated with from about 0.1% to about 5% by weight of a high molecular weight polyelectrolyte polymer having cationic substituents containing nitrogen having a positive charge and an emulsion polymerized resin binder applied to said absorbent materials in the form of a pattern.

9. Absorbent fibrous materials as defined in claim 8 wherein the high molecular weight polyelectrolyte polymer is polyethylene imine.

10. Absorbent fibrous materials as defined in claim 8 wherein the high molecular weight polyelectrolyte polymer is a salt of a complex polyamine.

11. Absorbent fibrous materials as defined in claim 8 wherein the high molecular weight polyelectrolyte polymer is a chemically modified cationic starch.

12. Absorbent fibrous materials as defined in claim 8 wherein the emulsion polymerized resin is a self cross-linking acrylic polymer.

References Cited

UNITED STATES PATENTS

| | | | |
|---|---|---|---|
| 2,470,042 | 5/1949 | McLean et al. | 117—76 |
| 2,973,285 | 2/1961 | Berke et al. | 117—38 |
| 3,009,822 | 11/1961 | Drelich et al. | 117—38 |
| 3,297,476 | 1/1967 | Kane | 117—56 |

WILLIAM J. VAN BALEN, Primary Examiner

U.S. Cl. X.R.

117—76

PC-1050
(5/69)

UNITED STATES PATENT OFFICE
CERTIFICATE OF CORRECTION

Patent No. 3,594,210      Dated July 20, 1971

Inventor(s) Arthur H. Drelich

It is certified that error appears in the above-identified patent and that said Letters Patent are hereby corrected as shown below:

After the ABSTRACT OF THE DISCLOSURE, the following paragraph should appear:

"This patent application is a continuation-in-part of earlier filed, copending patent application, Serial No. 639,011, filed May 17, 1967, now abandoned."

Signed and sealed this 14th day of January 1975.

(SEAL)
Attest:

McCOY M. GIBSON JR.
Attesting Officer

C. MARSHALL DANN
Commissioner of Patents